Patented Aug. 21, 1923.

1,465,907

UNITED STATES PATENT OFFICE.

FREDERICK W. HUBER, OF RIVERSIDE, CALIFORNIA, ASSIGNOR, BY MESNE ASSIGNMENTS, TO WESTERN PRECIPITATION COMPANY, A CORPORATION OF CALIFORNIA.

PROCESS OF PRODUCING CEMENT AND BY-PRODUCTS.

No Drawing.     Application filed December 6, 1917.   Serial No. 205,870.

*To all whom it may concern:*

Be it known that I, FREDERICK W. HUBER, a citizen of the United States, residing at Riverside, in the county of Riverside and State of California, have invented certain new and useful Improvements in Processes of Producing Cement and By-Products, of which the following is a specification.

It is well known that in the calcination of Portland cement raw mix containing potassium compounds, a part at least of the potassium content thereof is volatilized in the calcining and clinkering operation or operations, and processes have heretofore been proposed for the recovery of the so volatilized potassium compounds, with the production of material as a by-product suitable for the production of potash salts. In the prior art it has also been suggested to assist the volatilization of the potassium compounds from the raw mix, by the addition thereto of haloid compounds, or other salts capable of assisting in the volatilization.

In accordance with the process of the present invention, I add to the cement making raw mix, sodium chlorid (i. e., common salt) in amount much more than that amount which would be equivalent to the $K_2O$ content of the cement making raw mix. In computing the amount to be added, 1 part of $K_2O$ is considered as being chemically equal to 1.2 parts of NaCl. In practice I have found that it is advisable to add, for each 1 part of $K_2O$, not less than about 2.4 to 3.6 parts of NaCl. In some localities the Portland cement raw material may be found to contain some sodium chlorid and this of course may be taken into consideration in computing the amount of sodium chlorid to be added. The raw mix, containing the sodium chlorid is then calcined and clinkered, for example in a rotary kiln heated by a counter current flame of powdered coal or other suitable fuel, and the waste gases or flue gases resulting from the operation, which contain in addition to a considerable amount of flue dust, substantially the entire amount of potassium in the original raw mix, are then treated for the recovery of the potassium compounds therefrom.

In the cement burning kiln, the material is heated to a temperature of approximately 1300-1400° C., in a current of gases, constituting the products of combustion of the fuel, usually together with some air. The sodium chlorid there present at first reacts with the potassium compounds in the cement mixture, and the potassium compounds being less readily volatile are vaporized. The use of the sodium chlorid or other volatilizing agent employed, in considerable excess over the amounts of potassium compounds to be replaced constitutes an essential feature, and by the use of such excess, not only is substantially the entire amount of potassium present volatilized in the form of chlorid (with or without sulfate depending upon the composition of the raw mix and of the fuel) but the potassium compounds are prevented, by this excess of sodium compounds present, from uniting with the ash produced by the combustion of the coal, and accordingly the liberated and volatilized potassium compounds are carried along with the flue gases, in substantially the entire amount present in the raw mix.

The mixture fed to the rotary kiln may be and is preferably ground to a fine powder, with the added salt, and this grinding may be effected by wet or dry grinding, in a manner well known in the art.

The continued heating of the cement making material in the clinkering zone, during and after the stage of liberation of the potassium compounds has a further effect in vaporizing the major part of the excess of sodium chlorid added, and this excess of sodium chlorid when vaporized is likewise swept along by the flue gases. The flue gases leaving the kiln will accordingly contain three classes of materials, which it is necessary to consider in connection with the process of the present invention. These three classes of materials may be referred to as follows:

1. Flue dust containing particles of cement, particles of unburned or partially burned cement making raw material, coal ashes if coal be employed as the fuel, and other dust-like material in a solid state.

2. Vaporized potassium compounds and potassium compounds which existed in the form of vapor in the hottest zone of the kiln, but which have partially condensed into the form of a fume.

3. Sodium chlorid and other sodium compounds also existing in the form of vapor or fume.

The flue gases containing solid materials as above specified, are then treated for the recovery of the materials specified, and it is of course advisable and preferable, to classify these materials in such a way as to eventually separately obtain the three materials, as separate or separated products.

In practice I have found the following method, forming a part of the present invention, to constitute a practical and efficient method of conducting the collection and separation of the products. The gases leaving the cement kiln, which are at a high temperature, (a temperature approaching or at a red heat, under ordinary working conditions), are first brought into contact with water, in such a manner as to considerably cool the gases, separate the major part of the dust and coarser particles, and to absorb some of the fume of alkali metal compounds. This operation may be conducted by causing the gases to pass through a gas scrubber, in which they are subjected to one or preferably a plurality of water sprays, and in which the gases are caused to rapidly impinge upon liquid in the bottom of the washer. This operation is preferably conducted in a washer in which the gases pass over and under baffles in staggered relation, water being placed in the bottom of the treating receptacle or washer, and water sprays or means for producing thin sheets or films of water being provided, for example in the upper portion of such gas washer. It is desirable in carrying out this part of the process, to allow the liquid to be withdrawn from the bottom of the gas washer and after more or less settling and sedimentation, to reintroduce such liquid as a spray into the gas washer, this serving to concentrate the solution as regards sodium and potassium compounds. The temperature of the water coming out of this gas washer, in practice may be close to the boiling point. This operation not only produces the effects above stated, but also leaves the gases saturated with water vapor. The gases are then carried to another gas washer in which they are scrubbed with water, preferably at a considerably lower temperature, the water coming into the second gas washer being preferably cold water, that is to say water at ordinary atmospheric temperature, and the volume of water being so adjusted as to allow the liquid to be removed from the gas washer at a temperature of say about 60° C. The liquid collected in the first washing apparatus, which may consist of a solution substantially saturated at the boiling temperature with sodium chlorid and potassium chlorid, is then drawn off.

During the washing operation, the major portion at least, and usually the entire amount of the sodium sulfate and potassium sulfate present will have been converted, by interaction with the water and free lime of the flue dust, into calcium sulfate which is only slightly soluble in water and which is accordingly precipitated. In practice I have found that substantially the entire amount of the $SO_3$ content of the gases (which is largely derived from the combustion of the sulfur content of the fuel, and the volatilization or combustion of the sulfur compounds of the cement raw mix) is converted into calcium sulfate, the major portion of which settles out in the first washing apparatus with the flue dust.

The liquor is then pumped off, and is preferably conveyed, after filtration if desirable or necessary, to an evaporator, in which the liquid is concentrated at or near the boiling temperature. The first effect of such concentration is to precipitate substantially the entire proportion of calcium sulfate present therein, after which the evaporation is continued at approximately the boiling point, during which operation substantially the major portion of the sodium chlorid separates or crystallizes from the liquor, sodium chlorid being materially less soluble in boiling water, than potassium chlorid.

After the liquor has been concentrated sufficiently to separate the major portion of sodium chlorid by crystallization, it is drawn off to a separate receptacle and is cooled, whereupon potassium chlorid readily crystallizes out. The liquor is further evaporated, either at the boiling temperature, or at a lower temperature, for the recovery of the remaining potassium chlorid constituent.

I call attention to the fact that at the end of the first evaporation step, the liquor consists of a relatively pure solution of potassium chlorid, and accordingly the potassium crystallized therefrom is substantially pure, especially the first crop of crystals produced by cooling the liquor.

The sodium chlorid collected as above described, and also if desired, the sludge of flue dust collected in the gas washer may then be added to the cement making raw material, whereby the process becomes cyclical as regards the addition, condensation, separation and reuse of the sodium chlorid.

The use of an excess of a volatile material (for example sodium chlorid) serving to assist in the volatilization of the potassium compounds from cement raw-mix, with the subsequent recovery and reuse of the excess of such material in the treatment of a further amount of the cement raw mix, is itself believed to be a valuable and novel addition to the art of potash recovery, and I believe that I am the first to suggest such a procedure.

The wet treatment of the flue gases, as is above described, constitutes the preferred mode of operation, but the invention is not restricted thereto. In some instances it may be advisable to precipitate the dust in a dry way, for example by electrical precipitation. The dust may then be agitated with hot water to dissolve the potassium and sodium chlorids, the liquid separated from the sludge and the solution of potassium and sodium chlorids worked up as in the example above given, and the sodium chlorid reused in the process.

The flue gases, as above described, may pass directly from the kiln, that is to say from a housing surrounding the upper end of the kiln, into the first gas washer or saturator. I find it advisable, however, in ordinary practice, to pass the gases first through a cyclone dust collector, for the purpose of separating from the gases, a considerable portion of the dust, before the gases pass into the first washer. The material which separates in such a dry dust collector is of course the coarser part of the solid matter, and it does not carry any appreciable quantities of potassium compounds, and may be reintroduced into the kiln without any further theatment.

The liquor coming from the second scrubber or condenser is a very much weaker solution, as regards solid matter, than the liquor coming from the first scrubber or saturator. In practice I find it advisable to allow the liquor coming from the second scrubber to pass to a cooling pond, in which the same is cooled down to ordinary temperature or to say 50°C, after which it is pumped back and used as the spraying liquid in the second scrubber. The quantity of water used up in the system is of course also added in the second chamber.

A part of the liquor from the second scrubber is passed to the first scrubber, to make up for loss of liquor therein, both by evaporation, and to account for the quantity withdrawn for concentration and for separation of sodium and potassium compounds.

What I claim is:

1. A process of making cement and by-products which comprises heating to a clinker-forming temperature, a cement mix containing potassiferous material and containing sodium chlorid in amount much more than equivalent to the amount of such potassiferous ingredients, thereafter washing the flue gases with an aqueous liquid capable of removing at least the major part of the potassium compounds therein.

2. A process of making cement and by-products which comprises heating to a clinker-forming temperature, a cement mix containing potassiferous material and containing sodium chlorid in amount much more than equvalent to the amount of such potassiferous ingredients, thereafter washing the flue gases with an aqueous liquid capable of removing at least the major part of the potassium compounds therein, whereby a liquor containing sodium chlorid and potassium chlorid is produced, separating at least the major part of the sodium chlorid from such liquor, and thereafter separately separating the potassium compounds from said liquor.

3. A process of making cement and by-products which comprises adding sodium chlorid to a potassiferous cement forming mix, in amount equivalent to not less than at least the amount of potassium compounds present, calcining and clinkering the mixture to produce cement and flue gases containing sodium compounds and potassium compounds, scrubbing said flue gases with an aqueous liquid in a plurality of stages, to produce liquids containing sodium and potassium compounds, and concentrating said liquor and separating sodium compounds from the heated liquor, and thereafter separating potassium compounds therefrom.

4. In the production of cement from raw materials containing potassium compounds, the step of heating a mixture containing such raw materials and containing sodium chlorid equivalent to not materially less than twice to three times the potash content of such raw materials, said heating being sufficient to volatilize the at least major part of the potassium compounds, and thereafter recovering the potassium containing material driven off in said heating operation.

5. In the recovery of values from cement flue gases containing sodium chlorid, potassium chlorid, and flue dust, the step of subjecting such flue gases to the action of an aqueous liquid, whereby sodium chloride and potassium chloride are absorbed from the gases and whereby the flue dust is largely precipitated, and a reaction effected between the alkali metal sulfates and calicum compounds in said flue dust, and thereafter separating the sodium and potassium chlorids contained in said liquor.

6. The herein described process of obtaining a water-soluble potassium compound in the manufacture of Portland cement, which consists in mixing sodium chloride with the Portland cement mix, subjecting this mass to the direct action of the products of combustion of coal whereby the sodium chloride is volatilized and becomes adapted to combine with a substantial portion of the ash contents of the coal, which portion is thereby prevented from combining with the soluble potassium compounds, collecting the dust which is given off by the mix, leaching the dust to separate, from the insoluble contents thereof, the soluble potassium compounds and the soluble sodium compounds, introducing the leached dust into the Portland cement mix in the next cycle of the process, separating out the soluble potassium compounds from the soluble sodium compounds by evaporations and crystallization and the addition of the crystallized sodium compounds into the raw mix in the next cycle of the process.

7. The herein described process of obtaining a water soluble potassium compound in the manufacture of Portland cement, which consists in subjecting a Portland cement mix to the direct action of the products of combustion of coal in the presence of the ash contents of the coal, simultaneously subjecting said ash contents to the action of volatilized sodium chloride for combining with a substantial portion of said ash contents whereby said ash contents is substantially prevented from combining with the soluble potassium compounds, collecting the dust which is given off by said constituents, leaching the collected dust to separate therefrom the soluble potassium compounds and the soluble sodium chloride contained therein, introducing the leached dust into the Portland cement mix in the next cycle of the process separating out the soluble potassium compounds from the sodium chloride, and introducing the separated chloride into the raw mix in the next cycle of the process.

In testimony whereof I affix my signature.

FREDERICK W. HUBER.